United States Patent
Osuna

(10) Patent No.: US 11,770,482 B2
(45) Date of Patent: Sep. 26, 2023

(54) HAND ENGAGEMENT INTERFACE

(71) Applicant: Hewlett-Packard Development Company, L.P., Spring, TX (US)

(72) Inventor: Ricardo Osuna, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/609,427

(22) PCT Filed: Sep. 16, 2019

(86) PCT No.: PCT/US2019/051305
§ 371 (c)(1),
(2) Date: Nov. 8, 2021

(87) PCT Pub. No.: WO2021/054934
PCT Pub. Date: Mar. 25, 2021

(65) Prior Publication Data
US 2022/0232133 A1    Jul. 21, 2022

(51) Int. Cl.
*G06F 15/00* (2006.01)
*H04N 1/00* (2006.01)

(52) U.S. Cl.
CPC ..... *H04N 1/00392* (2013.01); *H04N 1/00397* (2013.01); *H04N 1/00413* (2013.01)

(58) Field of Classification Search
CPC ........... H04N 1/00392; H04N 1/00397; H04N 1/00413
USPC ........................................................ 358/1.9
See application file for complete search history.

(56) References Cited

U.S. PATENT DOCUMENTS

| | | |
|---|---|---|
| 4,332,464 A | 6/1982 | Bartulis et al. |
| 4,846,597 A | 7/1989 | Bryant et al. |
| 5,060,135 A | 10/1991 | Levine et al. |
| 5,440,325 A | 8/1995 | Edmark, III |
| 5,565,657 A | 10/1996 | Merz |
| 7,027,172 B1 | 4/2006 | Parulski et al. |
| 7,518,745 B2 | 4/2009 | Guerraz et al. |
| 7,536,653 B2 | 5/2009 | Badovinac et al. |
| 7,554,680 B2 | 6/2009 | Kanai et al. |
| 8,001,488 B1 | 8/2011 | Lawrence |
| 8,819,597 B2 | 8/2014 | Li |
| 9,321,348 B2 | 4/2016 | Peissner et al. |
| 2003/0210224 A1 | 11/2003 | Bartholomew et al. |

(Continued)

FOREIGN PATENT DOCUMENTS

| | | | |
|---|---|---|---|
| EP | 3450612 A1 | 3/2019 | |
| WO | WO-1997046917 A1 | 12/1997 | |
| WO | WO-2004038579 A2 | 5/2004 | |

OTHER PUBLICATIONS

Bianca Washing Machine, Nov. 11, 2017, Candy, 9 pgs, http://www.candydomestic.eo.uk/en_GB.

*Primary Examiner* — Mark R Milia
(74) *Attorney, Agent, or Firm* — Brooks, Cameron & Huebsch, PLLC

(57) ABSTRACT

Examples dis closed herein relate to displaying, proximate to a hand engagement interface, a plurality of user interface elements, receiving, via a freeform input interface associated with the hand engagement interface, a freeform input from a user, identifying a command associated with a first element of the plurality of user interface elements associated with the freeform input, and updating the display of the plurality of user interface elements according to the command associated with the first element of the plurality of user elements.

14 Claims, 4 Drawing Sheets

(56) References Cited

U.S. PATENT DOCUMENTS

| | | |
|---|---|---|
| 2005/0076308 A1 | 4/2005 | Mansell et al. |
| 2007/0210800 A1 | 9/2007 | Krampitz et al. |
| 2008/0218486 A1 | 9/2008 | Haseyama et al. |
| 2009/0086173 A1 | 4/2009 | Combs et al. |
| 2011/0113374 A1 | 5/2011 | Sheehan et al. |
| 2011/0274476 A1 | 11/2011 | Preliasco et al. |
| 2013/0235000 A1 | 9/2013 | Lee et al. |
| 2013/0345883 A1 | 12/2013 | Sloo et al. |
| 2014/0192001 A1 | 7/2014 | McKillop et al. |
| 2018/0349703 A1 | 12/2018 | Rathod |

HAND ENGAGEMENT INTERFACE

BACKGROUND

Multi-function devices often combine different components such as a printer, scanner, and copier into a single device. Such devices frequently receive refills of consumables, such as print substances (e.g., ink, toner, and/or additive materials) and/or media (e.g., paper, vinyl, and/or other print substrates). Often, these devices include a control panel for displaying information and/or receiving commands and other input.

Figure 1A:
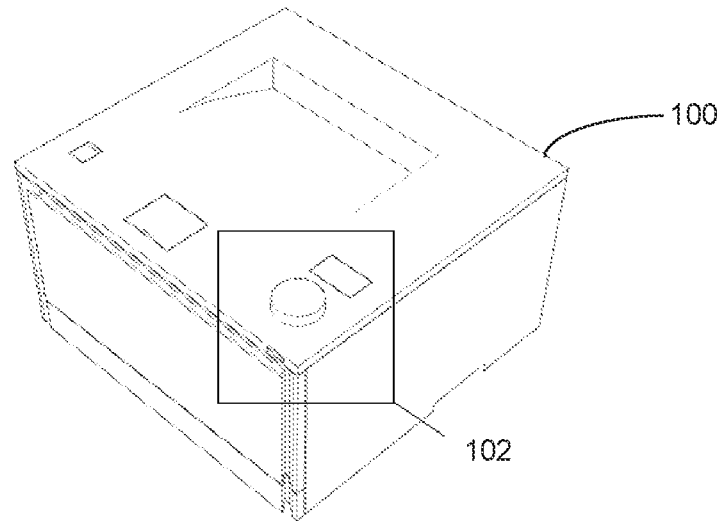
FIG. 1A is an isometric view of an example printing apparatus providing a hand engagement interface.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, such as an option to scan a physical document, which may be controlled via an on-device control panel, a connected application, and/or a remote service. Other options may include printing, copying, faxing, document assembly, etc. The scanning portion of an MFP may comprise an optical assembly located within a sealed enclosure. The sealed enclosure may have a scan window through which the optical assembly may scan a document, which may be placed on a flatbed and/or delivered by a sheet feeder mechanism.

Such MFPs may comprise a hand engagement interface including a manual actuator coupled to visual feedback circuitry, and a processor circuit coupled to the manual actuator and the visual feedback circuitry. Manual input from a user may be detected by way of the manual actuator, and responsive to the manual user input, selectable elements is displayed via the visual feedback circuitry. In various implementations, the hand engagement interface may be coupled to a mechanical system, such as a knob, and/or a touch-based system, such as a capacitive touch-sensing display.

Figure 1B:
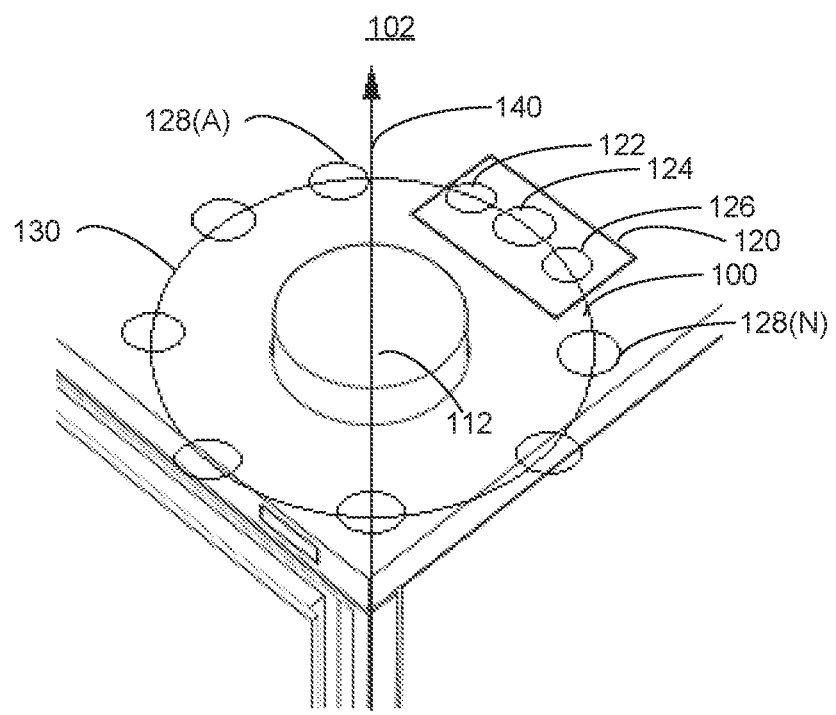
FIG. 1B is a schematic perspective view of a portion of the printing apparatus of FIG. 1A illustrating an example implementation of a mechanical engagement for a hand engagement interface.

FIG. 1A presents an isometric view of an example printing apparatus 100 providing a hand engagement interface 102. FIG. 1B presents a perspective schematic diagram of hand engagement interface 102 of printing apparatus 100 including a manual actuator 112 coupled to visual feedback circuitry by way of a processor circuit and memory. The manual actuator 112 may receive a mechanical user input from a user. The processor circuit executes machine readable instructions, described in greater detail below, to detect a mechanical user input to the manual actuator 112, which may be, for example, by way of rotation, sliding, pressing, and the like. Responsive to the mechanical user input by the user, the processor circuit may be programmed to execute machine readable instructions to render an image on a display 120 that may include user selectable elements 122, 124 and 126 by way of the visual feedback circuitry. The user is able to execute a control function of the printing apparatus by scrolling through and selecting an element from the selectable elements 122, 124, 126.

As illustrated in FIG. 1B, the manual actuator 112 is presented in the form of a rotatable dial. The actuator 112 may be rotated, and its relative position may be detected, for example, by coupling the dial to a rotational potentiometer, or to a circuit board including a circuit that may be closed when the rotatable dial is in a particular rotational position. Elements (122, 124, 126) may be changed and/or scrolled across the screen in response to user input to the dial.

As illustrated, the processor circuit may execute machine readable instructions to scroll the selectable elements 122, 124, 126 across the display screen along a path responsive to rotation of the rotatable mechanical dial 112. When executed by the processor circuit, the machine readable instructions may cause the selectable elements, such as in the form of various unique selectable elements 128 (A)-128 (N), to appear in a predetermined location along a virtual path 130, for example, as illustrated in FIG. 1B. The virtual path 130 may be a circle, ellipse, rectangle, triangle, serpentine or any other desired shape. When provided in the form of a circle, the virtual path 130 may effectively permit a user to experience the scrolling of the elements as if they were rotating a large dial with selectable elements 128 (A)-128(N) in predetermined locations along the circumference of the virtual circle. The machine readable instructions may cause each elements 128 (A)-128(N) to be assigned to a virtual location along the virtual circle 130. The spacing between the elements 122, 124, 126, 128 (A)-128(N) may be fixed and/or may be varied. If desired, the machine readable instructions may cause a particular elements 124 to be selectable, for example, when it is positioned in a predetermined part of the display 120, such as at the center of the display. As illustrated, the selectable elements 124 may be visually enlarged when displayed in the predetermined part of the display, and adjacent elements 122, 126 may be displayed as being relatively smaller. This may communicate to a user that the enlarged element 124 is the selectable element that a user may select in various ways, described in further detail below.

If desired, the scrolling of the elements 122, 124, 126, 128 (A)-128(N) may be performed in relative synchronization with the rotational displacement of the rotatable dial. In some implementations, this synchronization may be a 1:1 angular synchronization, such that the relative angular displacement of elements along the virtual path 130 is the same as the angular displacement of the dial. For coarser control, the relative angular displacement of the elements as displayed on the display 120 may be larger than the relative angular displacement of the dial. If desired, the virtual path 130 may include multiple virtual layers of selectable elements, by providing a plurality of stacked virtual paths. For example, more than one virtual circle of selectable elements may be provided, such as virtual circles of elements having twelve elements each. When a user scrolls through all twelve elements, a second virtual circle may start to be displayed with a second set of elements, and so forth until a predetermined number of virtual paths have been displayed. By way of further example, to provide finer control, a user may rotate the dial by a relatively larger angle to cause elements to scroll across the display. Thus, in the example of a circular virtual path 130, two, three, four, or more 360 degree rotations of the rotatable dial may be used in order to traverse the full extent of the virtual path.

As illustrated in FIG. 1B, the device 100 may include machine readable instructions that permit a user to select an enlarged element, or an element that is otherwise differentiated from the other element. This selection by the user of a particular element may be effectuated, for example, by permitting the rotatable mechanical dial to be linearly displaceable along a direction that is parallel to a central rotational axis Z thereof as indicated by the arrow 140 illustrated in FIG. 1B. Thus, a user may depress/push, pull, or otherwise actuate the dial to select the elements, for example, to execute a printer control function. The processor circuit therefore executes the appropriate machine readable instructions to interpret depression of the rotatable mechanical dial as mechanical user input.

In some implementations, the display screen 120 is not responsive to touch input. This is because the display screen 120 is principally used to scroll a listing or menus and submenus of selectable elements. Selection of an individual element may be performed in such instances, for example, by pressing the rotatable dial down, pressing another button or actuator, or the like. However, if desired, in some other implementation, the act of selection of an element that is displayed on the display 120 may be performed by touching the display 120 in the area of the screen where the element is located, or at another predetermined location on the screen. By being able to scroll the elements across the display screen 120, and permitting a user to select a sub menu, for example, after selecting the elements that in turn includes a further listing of elements, a small display screen 120 may be used to scroll and select among an extremely large number of elements without requiring a large display screen 120. Thus, the display screen may be, in some implementation, between about one and about three inches across, yet permit the user to select among dozens or even hundreds of elements. In various examples, a larger sized display may be used, as desired.

The display 120 may include any suitable type of display (holographic and the like), and is not limited to a flat panel display that produces a two-dimensional visual image. For example, additionally or alternatively the hand engagement interface may produce haptic feedback to inform a user of various events, such as changing from one element to the next by emitting a sound or vibration, and the like. It will be appreciated however that the display 120 may be an active display that is not preconfigured to display particular icons, but the display 120 may be configured to display an image in any location on its surface. This may be considered to be in contrast to a simplified display that has icons formed into it that light up when a particular circuit is closed. Thus the system overall is reconfigurable and programmable to display different elements in different locations of the screen. As further displayed in FIG. 1B, the hand engagement interface 102, illustrated as a rotatable mechanical dial, may be physically located or otherwise disposed near the display screen 120 to permit a user's hand eye coordination to facilitate use of the hand engagement interface 102.

In some implementations, hand engagement interface 102 may comprise a freeform input interface. For example, hand engagement interface 102 may comprise a touchpad configured to receive inputs from a user. For example, the top surface of actuator 112 may comprise a touch-sensing surface on which a user may enter freeform inputs such as letters, strokes, arrows, shapes, and the like. Such touch-sensing surfaces may comprise, but are not limited to resistive, surface acoustic wave, capacitive, optical imaging, infrared grid, and/or dispersive signal based surfaces. Generally, such surfaces react to a user's touch based on the change of electrical characteristics in the surface. For example, a user wishing to begin a copy operation may draw a "C" on the surface of actuator 112, causing the processor circuit to execute machine-readable instructions for displaying a set of copy options in display 120 that may be scrolled and/or selected as described above.

For another example, hand engagement interface 102 may comprise a freeform input interface based on an augmented reality interface. A camera and/or other imaging system may operate to capture and process gesture inputs from a user that may be mapped to commands executable by the hand engagement interface 102. A swipe gesture performed in front of hand engagement interface 102, for example, may be interpreted as turning a dial type hand engagement interface 102 and result in scrolling elements 122, 124, 126 across display screen 120.

Figure 2:
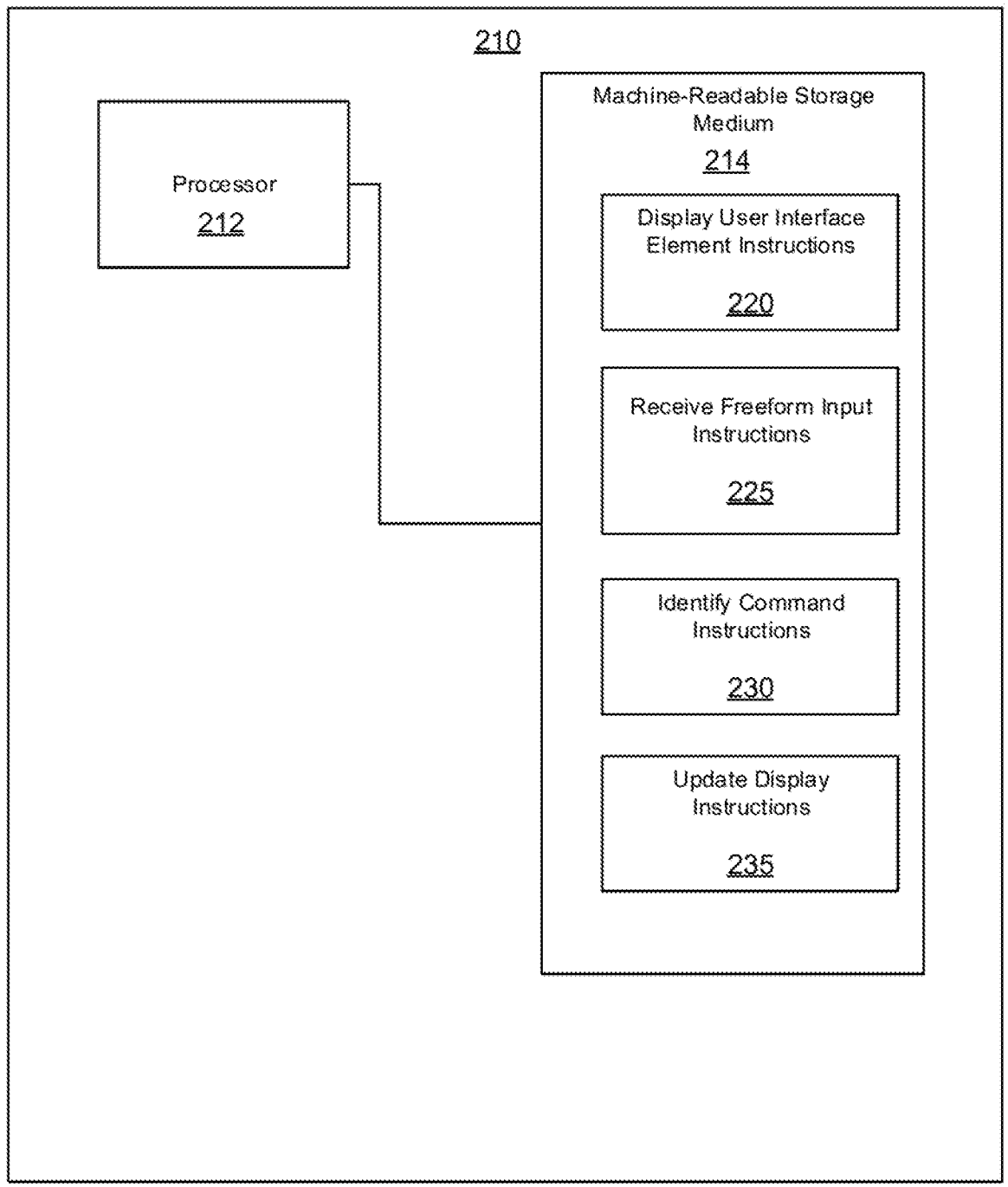
FIG. 2 is a block diagram of an example computing device for providing a hand engagement interface.

FIG. 2 is a block diagram of an example computing device 210 for providing hand engagement interface. Computing device 210 may comprise a processor 212 and a non-transitory, machine-readable storage medium 214. Storage medium 214 may comprise a plurality of processor-executable instructions, such as display user interface (UI) element instructions 220, receive freeform input instructions 225, identify command instructions 230, and update display instructions 235. In some implementations, instructions 220, 225, 230, 235 may be associated with a single computing device 210 and/or may be communicatively coupled among different computing devices such as via a direct connection, bus, or network.

Processor 212 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 214. In particular, processor 212 may fetch, decode, and execute instructions 220, 225, 230, 235.

Executable instructions 220, 225, 230, 235 may comprise logic stored in any portion and/or component of machine-readable storage medium 214 and executable by processor 212. The machine-readable storage medium 214 may comprise both volatile and/or nonvolatile memory and data storage components. Volatile components are those that do not retain data values upon loss of power. Nonvolatile components are those that retain data upon a loss of power.

The machine-readable storage medium 214 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Display user interface (UI) element instructions 220 may display, proximate to a hand engagement interface, a plurality of user interface elements. For example, device 210 may comprise hand engagement interface 102 comprising an actuator 112, such as a dial, and user interface elements such as UI elements 122, 124, 126 on a display 120 and/or selectable elements 128 (A)-128(N).

Receive freeform input instructions 225 may receive, via a freeform input interface associated with the hand engagement interface, a freeform input from a user. For example, a user may use their finger and/or a stylus to draw on a touch-based freeform input interface and/or may provide a gesture to an augmented reality based freeform input interface.

Identify command instructions 230 may identify a command associated with a first element of the plurality of user interface elements associated with the freeform input. The device 210 may interpret the input and attempt to map it to an available command. For example, a letter drawn on a touch sensitive surface and/or in the air in view of an augmented reality interface may be mapped to a command beginning with that letter. For another example, a tap or thumbs up gesture may be mapped to a confirm command. In some implementations, lists of all freeform inputs received at device 210 and/or across multiple devices of this type may be maintained by a processing service. If a new input is received that is not able to be mapped, device 102 may query the user for more information, such as via display 120. The user may, for example, draw an unfamiliar gesture in view of the augmented reality input. If device 210 is unable to map that gesture to a command, it may request the user to manually select, via hand engagement interface 102, the command the user intended. Device 102 may then create a mapping between the gesture and that command for future use.

Update display instructions 235 may update the display of the plurality of user interface elements according to the command associated with the first element of the plurality of user elements. In some implementations, the instructions 235 to update to the display of the plurality of user interface elements may comprise instructions to change a color of at least one element of the plurality of user interface elements. For example, instructions 235 may comprise instructions to identify the at least one element of the plurality of user interface elements most likely to be selected next among the display of the plurality of user interface elements. For example, a user may select a "copy" function. A user interface element associated with selecting a number of copies may be identified as the element most likely to be selected next and its color changed, from yellow to green, for example. The identification of the most likely element may be based on historical analysis of the behavior of the particular user and/or a plurality of users. Such analysis may be based on behaviors observed by device 210 alone and/or a plurality of devices. For example, a fleet of printing devices may upload steps and UI element selections from a workflow for each operation performed by each device, and analytic software may identify probabilistic patterns among those workflows, including the likelihood of any given command being chosen after a particular first command, and enabling that given command to be highlighted by changing the color of its associated UI element.

In some implementations, the instructions 235 to update to the display of the plurality of user interface elements comprise instructions 235 to display a second plurality of user interface elements as a replacement for the plurality of user interface elements. For example, a user may rotate hand engagement interface 102 to select element 124. Elements 122, 124, 126 may be removed from the display and replaced with a second set of elements, such as may be associated with a sub menu of commands associated with the first user interface element. For example, UI element 124 may be associated with a "print" command. Upon selection of the print command, elements 122, 124, and 126 may be replaced on display 120 with various option commands associated with a print job, such as duplex settings, a mono/color selection, a number of copies setting, etc.

Figure 3:
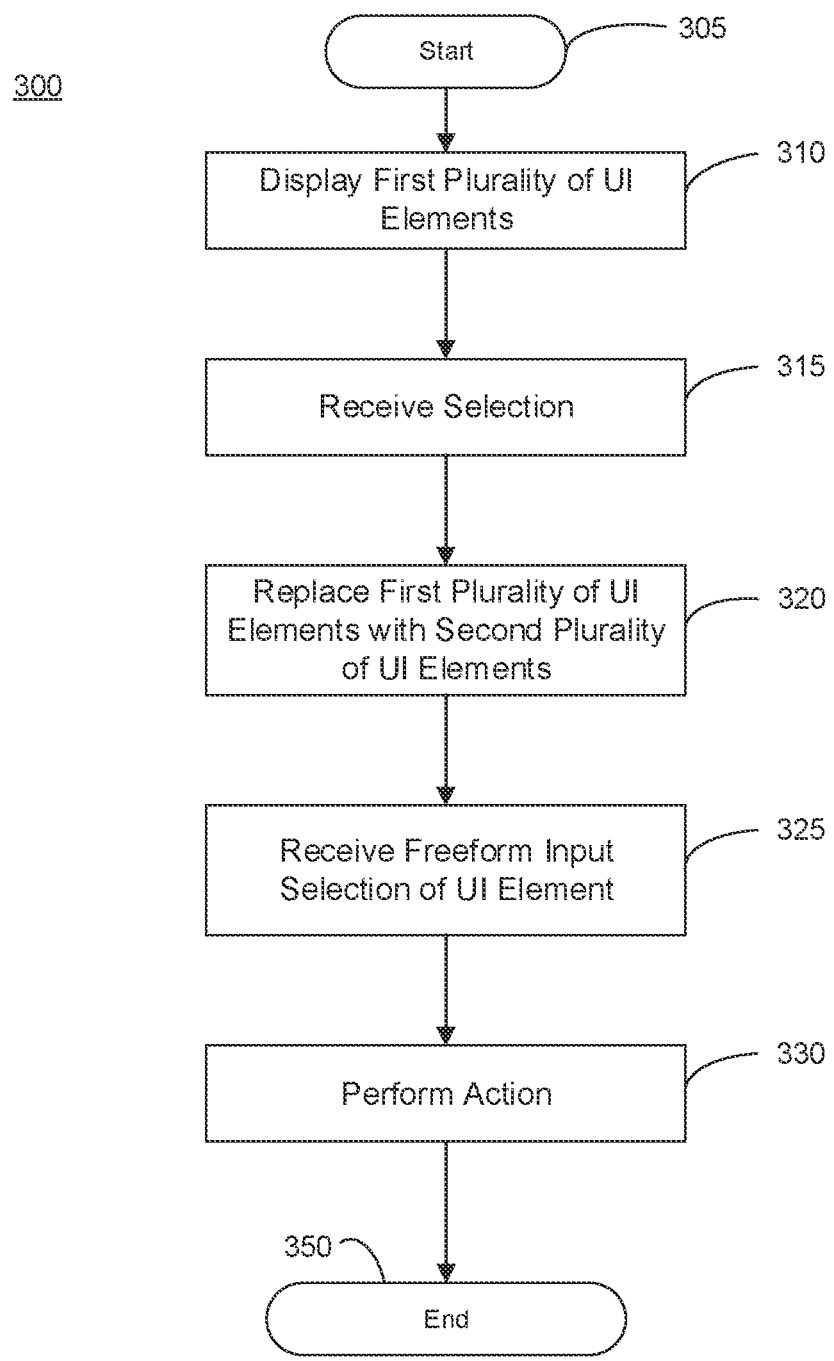
FIG. 3 is a block diagram of an example system for providing a hand engagement interface.

FIG. 3 is a flowchart of an example method 300 for hand engagement interface. Although execution of method 300 is described below with reference to computing device 210, other suitable components for execution of method 300 may be used.

Method 300 may begin at stage 305 and advance to stage 310 where device 210 may display a first plurality of user interface elements. For example, device 210 may display UI elements 122, 124, 126 on a display 120 located near an actuator 112. Selectable elements 128(A)-(N) may similarly be displayed on a surface, such as via embedded LEDs, illuminated icons, LCD displays, etc. proximate to the actuator 112. In some implementations, at least one element of the first plurality of user interface elements and the second plurality of user interface elements is displayed on the freeform input interface associated with the hand engagement device. For example, the surface of actuator 112 may comprise a capacitive touch sensing display surface and may display an UI element such as an icon directly on the actuator. In some implementations, the element may be displayed on the freeform input in order to enable user interaction. For example, a representation of a scanned document may be displayed in a freeform input interface comprising an augmented reality display to enable direct user interaction via gestures, such as selecting portions of the document for highlighting before a file associated with the scanned document is saved.

Method 300 may then advance to stage 315 where computing device 210 may receive, via a mechanical actuation of a hand engagement interface, a selection of a first element of the first plurality of user interface elements.

Method 300 may then advance to stage 320 where computing device 210 may replace the display of the first plurality of user interface elements with a display of a second plurality of user interface elements. For example, instructions 235 may update the display of the plurality of user interface elements comprise instructions 235 to display a second plurality of user interface elements as a replacement for the plurality of user interface elements. For example, a user may rotate hand engagement interface 102 to select element 124. Elements 122, 124, 126 may be removed from the display and replaced with a second set of elements, such as may be associated with a sub menu of commands associated with the first user interface element. For example, UI element 124 may be associated with a "print" command. Upon selection of the print command, elements 122, 124, and 126 may be replaced on display 120 with various option commands associated with a print job, such as duplex settings, a mono/color selection, a number of copies setting, etc.

In some implementations, at least one element of the second plurality of user interface elements may be displayed in a different color than the rest of the second plurality of user interface elements. For example, the instructions 235 to update to the display of the plurality of user interface elements may comprise instructions to change a color of at least one element of the plurality of user interface elements. For example, instructions 235 may comprise instructions to identify the at least one element of the plurality of user interface elements most likely to be selected next among the display of the plurality of user interface elements. For example, a user may select a "copy" function. A user interface element associated with selecting a number of copies may be identified as the element most likely to be selected next and its color changed, from yellow to green, for example. The identification of the most likely element may be based on historical analysis of the behavior of the particular user and/or a plurality of users. Such analysis may be based on behaviors observed by device 210 alone and/or a plurality of devices. For example, a fleet of printing devices may upload steps and UI element selections from a workflow for each operation performed by each device, and analytic software may identify probabilistic patterns among those workflows, including the likelihood of any given command being chosen after a particular first command, and enabling that given command to be highlighted by changing the color of its associated UI element.

In some implementations, replacing the display of the first plurality of user interface elements with the display of the second plurality of user interface elements may comprise replacing only a subset of the display of the first plurality of user interface elements. For example, elements 124 and 126 may be replaced with different elements while element 122 remains the same (e.g., a "Back to Previous Menu" command). In another example, one, some, and/or all of selectable elements 128(A)-(N) may be replaced while one, some, and/or all of elements 122, 124, 126 remain the same.

Method 300 may then advance to stage 325 where computing device 210 may receive, via an input to a freeform input interface associated with the hand engagement interface, a selection of a second element of the second plurality of user interface elements. For example, device 210 may execute receive freeform input instructions 225 to receive, via a freeform input interface associated with the hand engagement interface, a freeform input from a user. For example, a user may use their finger and/or a stylus to draw on a touch-based freeform input interface and/or may provide a gesture to an augmented reality based freeform input interface.

Method 300 may then advance to stage 330 where computing device 210 may perform an action associated with the second element of the second plurality of user interface elements. For example, device 210 may execute identify command instructions 230 to identify a command associated with a first element of the plurality of user interface elements associated with the freeform input. The device 210 may interpret the input and attempt to map it to an available command. For example, a letter drawn on a touch sensitive surface and/or in the air in view of an augmented reality interface may be mapped to a command beginning with that letter. For another example, a tap or thumbs up gesture may be mapped to a confirm command. In some implementations, lists of all freeform inputs received at device 210 and/or across multiple devices of this type may be maintained by a processing service. If a new input is received that is not able to be mapped, device 102 may query the user for more information, such as via display 120. The user may, for example, draw an unfamiliar gesture in view of the augmented reality input. If device 210 is unable to map that gesture to a command, it may request the user to manually select, via hand engagement interface 102, the command the user intended. Device 102 may then create a mapping between the gesture and that command for future use.

In some implementations performing the action associated with the second element may comprise completing an operation. For example, the first UI element selected may comprise a "copy" command and the second element selected (e.g., by the user drawing a "2" on the freeform input interface) may set the number of copies to be produced. Device 210 may then perform the operation of producing two copies of a document provided by the user.

Method 300 may then end at stage 350.

Figure 4:
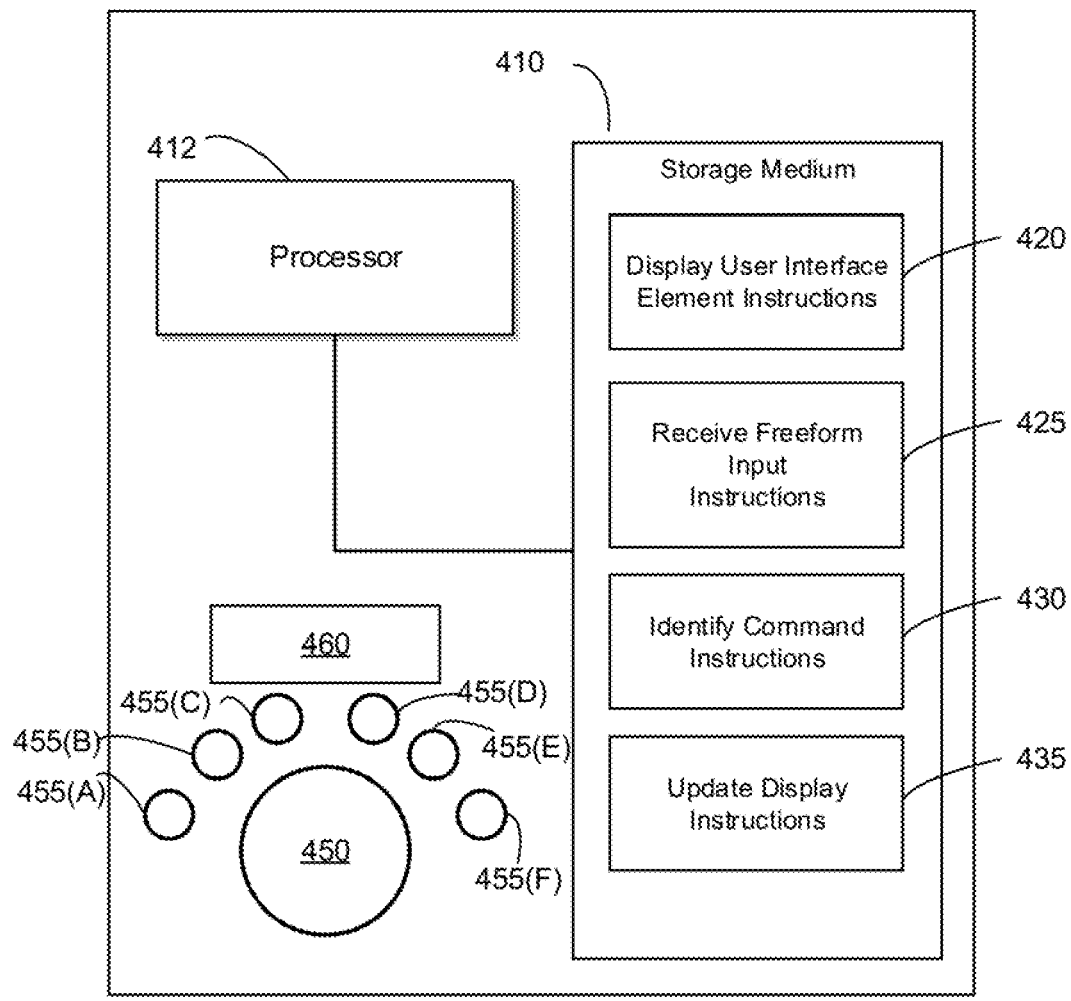
FIG. 4 is a flowchart of an example method for providing a hand engagement interface.

FIG. 4 is a block diagram of an example printing apparatus 400 for providing hand engagement interface. Apparatus 400 may comprise a multi-function printer device comprising a storage medium 410, and a processor 412. Apparatus 400 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Apparatus 400 may store, in storage medium 410, display user interface (UI) element instructions 420, receive freeform input instructions 425, identify command instructions 430, and update display instructions 435 as described above.

Apparatus 400 may further comprise a hand engagement interface comprising a rotatable mechanical actuator 450 and a user interface display area comprising a plurality of user interface elements 455 (A)-(F) and a screen 460. Any and/or all of actuator 450, elements 455(A)-(F), and screen 460 may be configured as freeform input interfaces operable to receive tactile input from a user. For example, a top surface of actuator 450 may be a touchpad and/or elements 455(A)-(F) may be displayed on a freeform input interface.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed is:

1. A non-transitory machine readable medium storing instructions executable by a processor to:
    display, proximate to a hand engagement interface of a printing apparatus, a plurality of user interface elements;
    receive, via a freeform input interface associated with the hand engagement interface, a freeform input from a user, wherein the processor determines:
        a receipt of the freeform input in response to a touch-based input at the freeform input interface received from the user; and
        the receipt of the freeform input in response to an augmented reality based input of an augmented reality interface, the augmented reality interface comprising an imaging system to capture and process a gesture input from the user that is mapped to a command executable by the hand engagement interface, wherein the freeform input interface comprises the augmented reality interface;
    identify a command associated with a first element of the plurality of user interface elements associated with the freeform input; and update the display of the plurality of user interface elements according to the command associated with the first element of the plurality of user interface elements.

2. The non-transitory machine readable medium of claim 1, wherein the instructions to update to the display of the plurality of user interface elements comprise instructions to change a color of at least one element of the plurality of user interface elements.

3. The non-transitory machine readable medium of claim 2, wherein the instructions to change the color of the at least one element of the plurality of user interface elements comprise instructions to identify the at least one element of the plurality of user interface elements as most likely to be selected next among the display of the plurality of user interface elements.

4. The non-transitory machine readable medium of claim 1, wherein the instructions to update to the display of the plurality of user interface elements comprise instructions to display a second plurality of user interface elements as a replacement for the plurality of user interface elements.

5. The non-transitory machine readable medium of claim 4, wherein the second plurality of user interface elements are associated with a sub menu of commands associated with the first user interface element.

6. The non-transitory machine readable medium of claim 1, wherein the freeform input received from the user comprises at least one letter drawn on the freeform input interface by the user.

7. The non-transitory machine readable medium of claim 1, wherein the hand engagement interface comprises a rotatable dial.

8. The non-transitory machine readable medium of claim 1, wherein the freeform input interface comprises a touch sensitive surface.

9. A method comprising:
displaying a first plurality of user interface elements;
receiving, via a mechanical actuation of a hand engagement interface of a printing apparatus, a selection of a first element of the first plurality of user interface elements;
replacing the display of the first plurality of user interface elements with a display of a second plurality of user interface elements;
receiving, via an input to a freeform input interface associated with the hand engagement interface, a selection of a second element of the second plurality of user interface elements wherein the freeform input interface determines:
a receipt of the freeform input in response to a touch-based input at the freeform input interface received from a user; and
the receipt of the freeform input in response to an augmented reality based input of an augmented reality interface, the augmented reality interface comprising an imaging system to capture and process a gesture input from the user that is mapped to a command executable by the hand engagement interface, wherein the freeform input interface comprises the augmented reality interface; and
performing an action associated with the second element of the second plurality of user interface elements.

10. The method of claim 9, wherein replacing the display of the first plurality of user interface elements with the display of the second plurality of user interface elements comprises replacing only a subset of the display of the first plurality of user interface elements.

11. The method of claim 9, wherein at least one element of the first plurality of user interface elements and the second plurality of user interface elements is displayed on the freeform input interface associated with the hand engagement device.

12. The method of claim 9, wherein at least one element of the second plurality of user interface elements is displayed in a different color than the rest of the second plurality of user interface elements.

13. A printing apparatus, comprising:
a hand engagement interface comprising a mechanical actuator and a user interface display area; and
a processor circuit coupled to the hand engagement interface, wherein the processor circuit executes machine readable instructions to:
display, in the user interface display area, a plurality of user interface elements;
receive, via a freeform input interface associated with the hand engagement interface, an input from a user, wherein the processor circuit determines:
a receipt of the input in response to a touch-based input at the freeform input interface received from the user; and
the receipt of the input in response to an augmented reality based input of an augmented reality interface, the augmented reality interface comprising an imaging system to capture and process a gesture input from the user that is mapped to a command executable by the hand engagement interface, wherein the freeform input interface comprises the augmented reality interface;
identify a command associated with a first element of the plurality of user interface elements associated with the freeform input; and
update the display of the plurality of user interface elements according to the identified command associated with the first element of the plurality of user interface elements, wherein the instructions to update the display comprise instructions to modify a color of at least one element of the plurality of user interface elements.

14. The apparatus of claim 13, wherein the freeform input interface at least partially comprises the user interface display area.

* * * * *